(12) United States Patent
Shibuya et al.

(10) Patent No.: US 6,870,638 B1
(45) Date of Patent: Mar. 22, 2005

(54) HALFTONE PROCESSING APPARATUS USING DISTRIBUTING PWM METHOD

(75) Inventors: Takeshi Shibuya, Chiyoda (JP); Mieko Ishii, Tsuchiura (JP); Hiroshi Tanigaki, Hadano (JP)

(73) Assignee: Hitachi, Ltd., Tokyo (JP)

( * ) Notice: Subject to any disclaimer, the term of this patent is extended or adjusted under 35 U.S.C. 154(b) by 925 days.

(21) Appl. No.: 09/644,068

(22) Filed: Aug. 23, 2000

(30) Foreign Application Priority Data

Sep. 27, 1999 (JP) .......................................... 11-271800

(51) Int. Cl.[7] .............................................. H04N 1/405
(52) U.S. Cl. ....................... 358/1.9; 358/534; 358/3.06; 358/3.09; 382/237; 347/131; 347/196; 347/252
(58) Field of Search ....................... 358/1.9, 534, 535, 358/536, 466, 3.01, 3.02, 3.06, 3.09, 3.13, 3.14, 3.21; 382/237, 270; 347/131, 251, 252, 196

(56) References Cited

U.S. PATENT DOCUMENTS

| | | | | |
|---|---|---|---|---|
| 4,783,837 A | * | 11/1988 | Kawamura et al. | 382/270 |
| 5,134,495 A | | 7/1992 | Frazier et al. | 382/299 |
| 5,553,200 A | * | 9/1996 | Accad | 358/1.9 |
| 6,052,203 A | * | 4/2000 | Suzuki et al. | 358/1.9 |
| 6,191,868 B1 | * | 2/2001 | Shibuya et al. | 358/1.9 |
| 6,326,993 B1 | * | 12/2001 | Satoh et al. | 347/252 |
| 6,369,911 B1 | * | 4/2002 | Hattori | 358/1.9 |
| 6,476,847 B2 | * | 11/2002 | Satoh et al. | 347/252 |
| 6,498,617 B1 | * | 12/2002 | Ishida et al. | 347/252 |
| 6,674,547 B1 | * | 1/2004 | Kadowaki | 358/3.01 |

FOREIGN PATENT DOCUMENTS

JP   A-9-331448   12/1997

OTHER PUBLICATIONS

Yasuhiro Oda et al., "New Halftone Screening Technology focused on highlight image reproduction", Japan Hardcopy '95 Transactions, pp. 143–146.

* cited by examiner

*Primary Examiner*—Thomas D. Lee
(74) *Attorney, Agent, or Firm*—Antonelli, Terry, Stout & Kraus, LLP (57) ABSTRACT

An image processing apparatus for a laser printer, wherein a halftone control through laser pulse modulation (PWM) is used in combination with distributed clustered-dot halftone processing which distributes a tone level over four clustered-dots, and the value represented by higher bits of a threshold are used to switch a PWM pulse pattern in a highlight area to a discontinuous pattern, thereby implementing the high density halftone processing, which provides a high highlight tone density and stability, only with a small scale memory and circuit.

14 Claims, 8 Drawing Sheets

| INPUT VALUE (BINARY) | PWM PULSE PATTERN VALUE | INPUT VALUE (BINARY) | PWM PULSE PATTERN VALUE |
|---|---|---|---|
| 0000 | 0000 | 1000 | 0000 |
| 0001 | 1010 | 1001 | 1000 |
| 0010 | 1100 | 1010 | 1100 |
| 0011 | 1101 | 1011 | 1110 |
| 0111 | 1110 | 1111 | 1111 |

| BASIC THRESHOLD VALUE PATTERN | $\theta$ | NUMBER OF CELLS | TOTAL NUMBER OF TONE LEVELS nmax |
|---|---|---|---|
| (a) [6 7 8 9 / 0 1 5 / 2 3 4] | 71.8° | 10 | 161 |
| (b) [6 7 8 / 0 1 5 / 2 3 4] | 0° | 9 | 145 |
| (c) [5 6 / 7 0 1 4 / 2 3] | 45° | 8 | 129 |
| (d) [0 1 / 2 3 4] | 26.5° | 5 | 81 |
| (e) [6 7 8 9 / 0 1 5 5 / 2 3 4 13 14 15 / 9 10 11 13 14 15] | 26.5° | 20(15) | 256 |

FIG.9

INPUT TONE VALUE (8bit)

HALFTONE PROCESSING APPARATUS USING DISTRIBUTING PWM METHOD

BACKGROUND OF THE INVENTION

The present invention relates generally to an image output apparatus for printing an image produced by a printer, a facsimile or the like as a set of points (pixels), and more particularly, to an apparatus for performing image processing to represent a continuous halftone image in combination of a laser pulse width modulation (PWM) with a clustered-dot dither screening method.

Conventionally, an increase in the number of tone levels in halftone images produced by a laser printer has often relied on a method of subdividing each one pixel by means of laser pulse width modulation (PWM).

However, a reduced width of a laser pulse often results in variations in resulting products, particularly in the charging characteristics of a photoconductor and a toner, and in higher susceptibility to instabilities due to environmental variations such as temperature and humidity, thereby causing a problem of instable halftone reproduction in a highlight area, in which the image density is low, and a failure in providing a tone density commensurate with the number of divided laser pulses due to delayed activation of the laser and a delayed response of the photoconductor.

As a prior art approach addressing such problems, an article entitled "New Halftone Screening Technology Focused on Highlight Image Reproduction" (Japan Hardcopy '95 Transactions, pp. 143–146, by Yasuhiro Oda et al.) discloses a method of avoiding the use of narrow laser pulses by switching the halftone processing from line screen method to clustered-dot dither screen method only in a highlight area. JP-A-9-331448 discloses a method of stabilizing a reproduced image by adding adjustments to PWM outputs, using a look up table (LUT), corresponding to variations in environmental conditions and so on. Further, U.S. Pat. No. 5,134,495 (corresponding to Published Japanese Translation of PCT International Publication for Patent Application No. JP-A-6-504004) discloses a technology of performing a resolution transformation for increasing the resolution of a laser printer beyond the inherent engine performance by the use of multiple exposure of laser light which does not exceed a pixel threshold value.

Among the prior art approaches mentioned above, the method of processing a highlight area as clustered-dot dither screen is effective in stabilizing the reproduction of the tone in the highlight area, but may cause coarse isolated clustered-dot to be emphasized when a printer engine inherently has a large minimum pixel, leading to prominence of noise in the highlight area.

Also, when a look up table is relied on to perform a feedback to the varying environment and aging changes, as disclosed in JP-A-9-331448, a large look up table must be prepared or any interpolation means for continuously supporting the varying environment must be used in combination in order to finely respond to the varying environment. Otherwise, this method would emphasize instable images at boundaries at which one look up table is switched to another. Of course, simple modifications of PWM output values using look up tables without performing the feedback with respect to the environmental conditions would not present characteristic differences from the γ-correction which has been conventionally performed commonly on the halftone processing.

On the other hand, an instable region in a highlight area resulting from a shallow potential of an electrostatic latent image due to subdivided laser pulses extends as an instable potential region increases near toner attaching limits in the latent image potential. Consequently, as such an instable region in the highlight area extends, the feedback correction using look up tables alone will experience difficulties in achieving sufficient stability due to the influence of variations in individual photoconductor, the characteristic distribution on the particular photoconductor, and so on, in addition to the influence of temperature and humidity. For this reason, the formation of a small, deep electrostatic potential to suppress the generation of instable potential regions plays a critical role for stabilizing a highlight image quality.

However, a method relying on the resolution transformation as shown in U.S. Pat. No. 5,134,495 substantially requires pixel value information for interpolated pixels exceeding the device resolution, as it describes "using a raster of pixels to represent said desired image, said raster having a predetermined raster resolution, said raster resolution being different from said device resolution." Thus, this type of method results in an increased cost of memories and associated circuits, as well as a longer data transfer time.

In addition, even though the resolution transformation functions as an effective means for a high end machine which exhibits relatively stable characteristics in terms of the photoconductor and so on, this is not true in low-price machines for use by general public, in which these characteristics are relatively instable, because the reproduction of isolated points is still instable as compared with dots of the inherent resolution originally provided by a printer engine. Thus, the resolution transformation is not suitable for the reproduction of thin lines, and is only effective in a halftone representation in which a plurality of dots are grouped into a set, as is the case with the clustered-dot dither processing, and in a relationship between clusters and dots as the smoothing of edges in fonts and so on.

It is therefore an object of the present invention to provide an image processing apparatus for use also in low-price laser printers that may exhibit instable characteristics, which implements the halftone processing for stably increasing a concentration of highlight tone by simple circuits, which can be mounted in ASIC, and accomplishes high speed and high quality image processing at a low cost.

SUMMARY OF THE INVENTION

The foregoing problem is solved by a halftone processing apparatus of the present invention, wherein a plurality of pulse patterns including a pulse pattern which discretely divides one pixel and a pulse pattern which continuously divides one pixel are provided as PWM pulse patterns for subdividing one pixel originally produced by a printer engine, such that the discrete pulse pattern and the continuous pulse pattern are switched by means of look up tables for a highlight area and another area, and this processing is combined with halftone processing relying on a clustered-dot dither for growing a plurality of clustered-dots in cyclic manner.

DETAILED DESCRIPTION OF THE EMBODIMENTS

Figure 12:
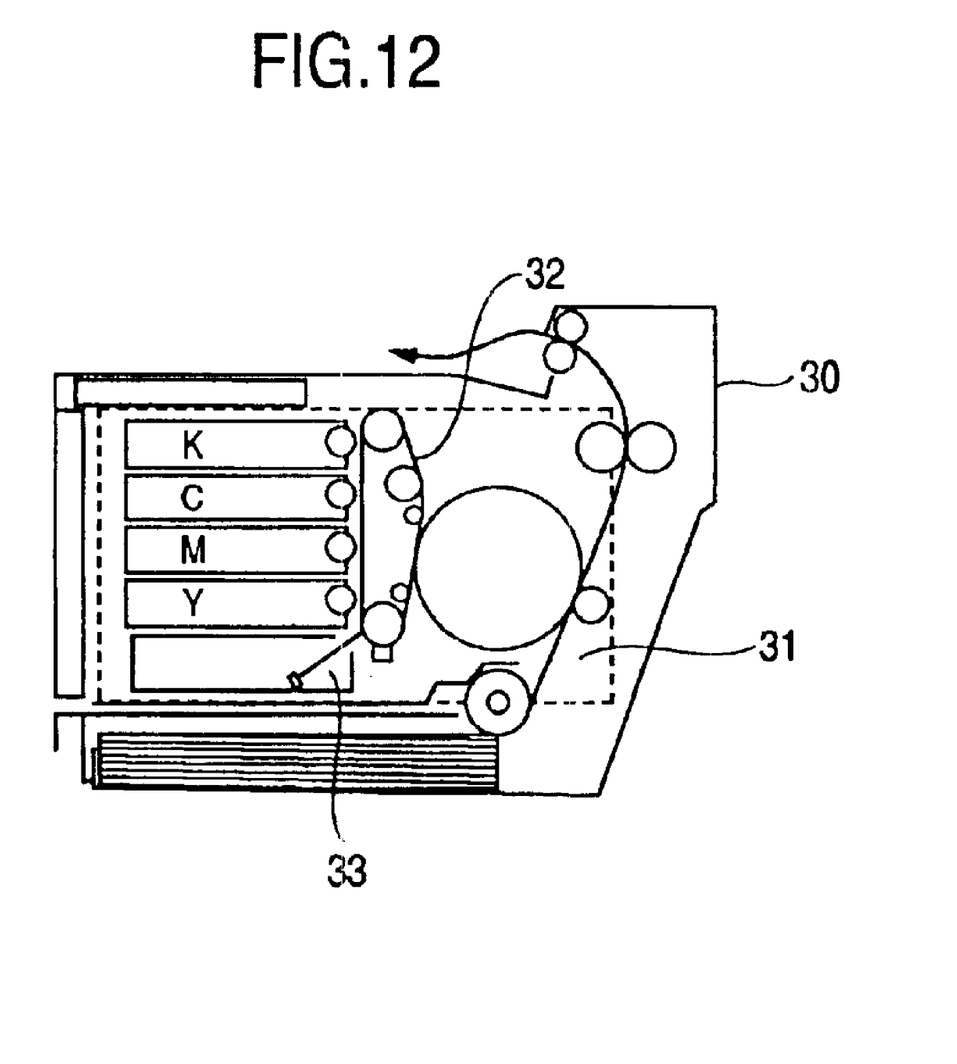
FIG. 12 is a diagram illustrating an example of a color laser printer which is equipped with the tone processing apparatus according to the present invention.

One embodiment of the present invention will hereinafter be described with reference to the accompanying drawings. FIG. 12 illustrates the configuration of a color laser printer 30 which contains a controller board 31 equipped with a halftone processing apparatus 9 to which the present invention is applied. In FIG. 12, the controller board 31 is represented by broken lines since it is mounted vertically on the bottom of the printer in parallel with other mechanisms required for printing operations. The tone processing apparatus 9 according to the present invention develops an input image signal in real time in synchronism with a horizontal synchronization signal and a vertical synchronization signal for controlling a photoconductive belt 32 and laser optics 33 to form an electrostatic latent image on the photoconductive belt 32.

It should be noted that while the following embodiment is described for color printing taken as an example, it goes without saying that the tone processing apparatus according to the present invention can be applied to monochrome printing.

Figure 1:
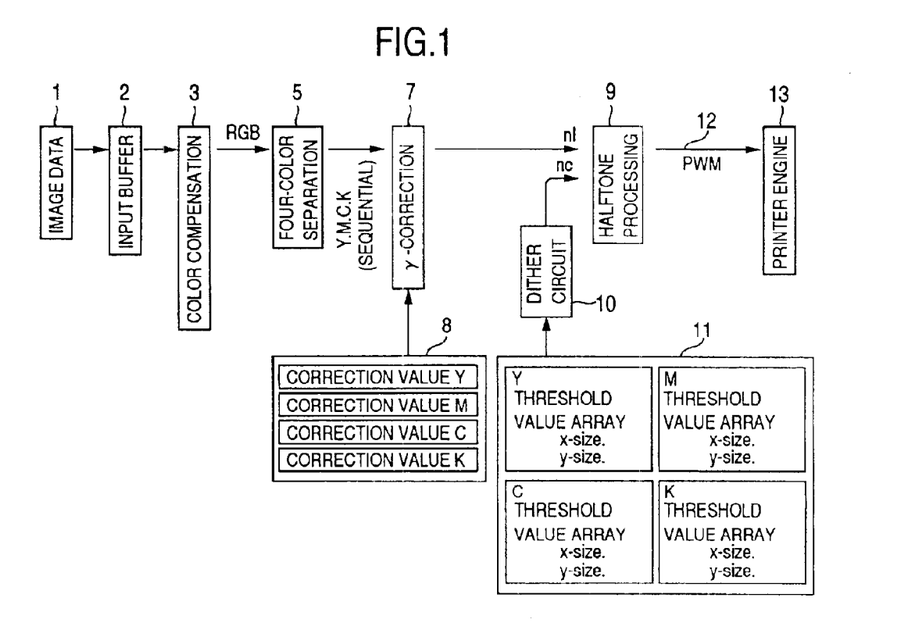
FIG. 1 is a flow diagram illustrating the flow of data processing which includes the present invention.

FIG. 1 illustrates the flow of image processing in a 600-dpi color printer which embodies the tone processing apparatus according to an embodiment of the present invention. Image data 1 to be printed is sent from a higher rank apparatus to the printer, and stored in an input buffer 2 as RGB data for one page. Since a printer engine 13 develops each of Y, M, C, K planes, the processing subsequent to the input buffer 2 in FIG. 1 is repeated four times, one for each of the Y, M, C, K planes, for one color image.

First, a four-color separating unit 5 initializes its interior as required to calculate Yellow from RGB point sequential data. In correspondence thereto, a γ-correction unit 7 loads an internal reference table with correction values corresponding to Yellow from a γ-correction value table 8. A dither circuit 10 in turn loads a threshold value array corresponding to Yellow and size data for the array from a table 11, and initializes its interior. The threshold value array is an array of values represented by eight bits in a range of 0 to 255 as shown in a threshold value array 27 of FIG. 8.

Thus, the RGB data sent from the input buffer 2 is subjected to a color correction by a color correction means 3, conversion to the Yellow data by the four color separating unit 5, and the tone correction by the γ-correction unit 7, and then outputted to the printer engine 13 as a PWM signal 12 by the tone processing apparatus 9.

As one page of the Yellow data has been processed, the four-color separating unit 5, the γ-correction unit 7, and the dither circuit 10 next reload again required parameters for Magenta, and initialize their interiors, respectively, and then perform similar processing to send one page of PWM signal 12 for Magenta to the printer engine 13.

Subsequently, the processing for Cyan and Black is performed in a similar manner. The respective color planes are switched in synchronism with the vertical synchronization signal of the printer engine. At this time, the threshold value array may be set such that it is changeable for each color plane.

Figure 2:
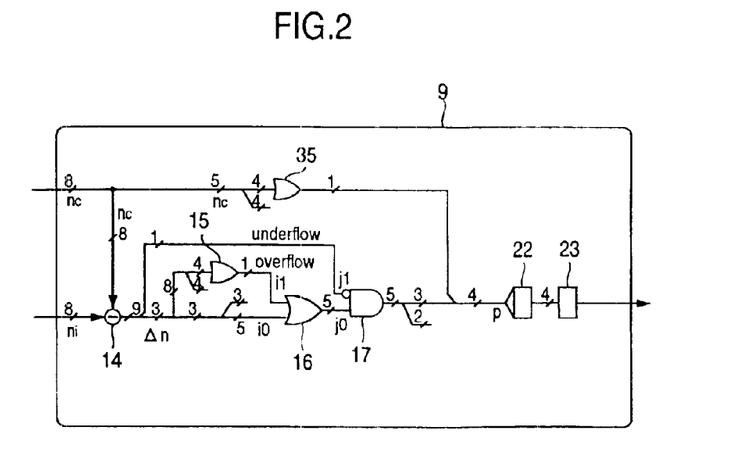
FIG. 2 is a circuit diagram illustrating an example of a halftone processing apparatus according to the present invention.

Next, an example of the tone processing apparatus 9 is illustrated in FIG. 2. In the example of FIG. 2, an input value ni to the tone processing apparatus 9 has 256 tone levels (represented by eight bits), one dot is divided into four by PWM, and a division pattern is specified by three bits.

Here, an OR circuit 15 and an OR circuit 35 in FIG. 2 are each a circuit which ORs the value of all of four bits inputted thereto to output a 1-bit value at "0" or "1" corresponding to the values, zero or non-zero, of the four input bits. An OR circuit 16 in turn ORs the value of each bit of a 5-bit input i0 and a 1-bit input i1 to output a 5-bit OR'ed value. Similarly, a NAND circuit 17 ANDs the value of each bit of the 5-bit input j0 and a negated 1-bit input j1 to output a 5-bit NAND'ed value.

In the former half of the processing in FIG. 2 including the NAND circuit 17, first, a difference Δn between a tone range of the input signal ni and a dither threshold value nc is calculated (Δn=ni−nc). Next, if the difference Δn is less than zero (Δn<0), an underflow signal from a subtractor circuit 14 causes the NAND circuit 17 to output all the bits at zero. On the other hand, if the difference Δn is equal to or larger than 16 (Δn 16), the OR circuit 15 first outputs the four higher bits except for the underflow signal from the subtractor circuit 14 at "1," and the OR circuit 16 outputs all the five bits at "1." Otherwise (0 n<16), the input 5-bit value to the OR circuit 16 is outputted as it is from the NAND circuit 17. These operations result in reduction of the 8-bit difference Δn to a 5-bit value in a range of 0 to 15 (and all bits at "1" which represent 31 in decimal).

Next, subsequent to the NAND circuit 17, the 1-bit output of the OR circuit 35 is appended to the three higher bits of the NAND circuit 17 of the output of the NAND circuit 17 as most significant side bit, and the two lower bits has been discarded, to produce a 4-bit value which is used as a selection signal for a PWM conversion table 22. Thus, the PWM conversion table 22 selects and outputs a 4-bit PWM pulse pattern value in accordance with this selection signal. Finally, a PWM generator circuit 23 outputs the pulse pattern value selected from the PWM conversion table 22 to the printer engine, as the final PWM signal.

In the foregoing description, of the 8-bit difference Δn, the three higher bits except for the underflow signal are discarded before the difference Δn is inputted to the OR circuit 16 to produce the 5-bit signal i0. However, the location at which the three higher bits are discarded in the circuit is not of particular importance. For example, the difference Δn may remain as an 8-bit signal until it passes through the NAND circuit 17, and after the difference Δn is outputted from the NAND circuit 17, the three higher bits and the two lower bits may be discarded from the 8-bit signal. Such implementation can also be readily made.

Figure 3:
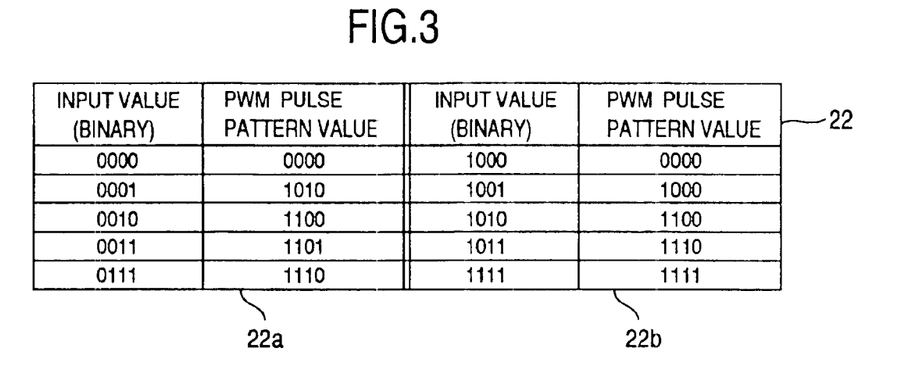
FIG. 3 is a table showing a correspondence between input values and PWM pulse patterns.

The next FIG. 3 shows an example of how the PWM conversion table 22 is set. An input value in the PWM conversion table 22 of FIG. 3 comprises the three lower bits as a first bit region determined by the difference value Δn and the most significant bit as a second bit region determined by the four higher bits of the threshold value nc. The PWM conversion table 22 of FIG. 3 includes a PWM pulse pattern value column 22a which lists values having the second bit region set at "0" and a PWM pulse pattern value column 22b which lists values having the second bit region set at "1."

FIGS. 4A to 4H show a correspondence relationship between combinations of these pulse pattern values and dots which are printed in correspondence thereto. Particularly, FIGS. 4A to 4H show growing patterns of isolated dots which discretely grow in response to the PWM pulse patterns. Specifically, in FIGS. 4A to 4H, sequences of 0's and 1's separated every four digits on the upper stages 37a–37h indicate pulse pattern values inputted to the PWM generator circuit; pulse patterns 38a–38h on the middle stages show PWM signals outputted from the PWM generator circuit 23; and dot shapes 39a–39h on the lower stages show the shapes of printed dots. It should be noted that in FIGS. 4A to 4H, the respective signals are interpreted from left to right, and the corresponding dots 39a–39h also grow from left to right.

Figure 4A:
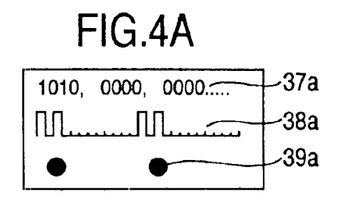
FIGS. 4A to 4H are diagrams showing a correspondence between PWM pulse patterns and printed dots.
Figure 4B:
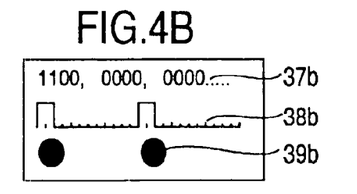
Figure 4C:
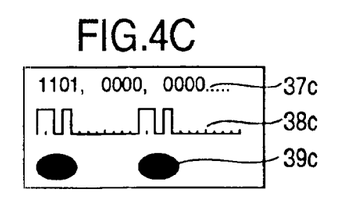
Figure 4D:
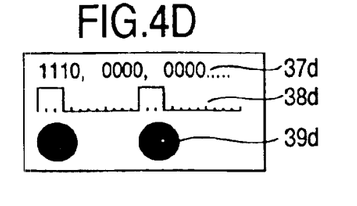
Figure 4E:
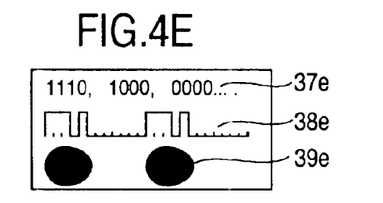
Figure 4F:
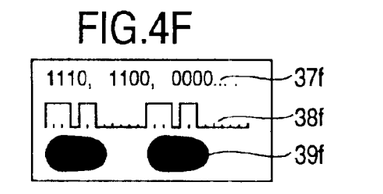
Figure 4G:
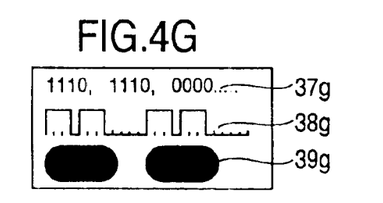
Figure 4H:
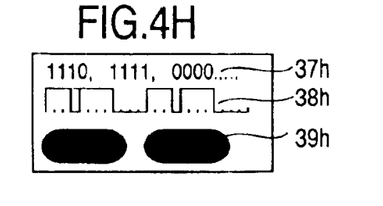

In FIGS. 4A to 4H, an original pulse for one dot of the printer engine is divided into four, so that the four-digit pulse pattern value corresponds to an ON/OFF pattern for one dot of the printer engine. In this event, as can be seen in FIGS. 4A and 4B, in the formation of isolated dots, a dot 39a corresponding to a pulse pattern value 1010 is formed smaller than a dot 39b corresponding to a pulse pattern value 1100. Also, a dot 39c corresponding to a pulse pattern value 1101 is formed as a middle sized dot which is larger than the dot 39b corresponding to the pulse pattern value 1100 and smaller than a dot 39d corresponding to a pulse pattern value 1110.

On the other hand, when an isolated dot is corresponded to a pulse pattern value 1000, this leads to the formation of a lighter dot than the dot 39a corresponding to the pulse pattern value 1010, in which case the resulting image density is extremely low. Thus, such correspondence of the isolated dot to the particular pulse pattern value results in an unnatural tone largely different in density from the dot 39b corresponding to the pulse pattern value 1100, as well as an instable image highly sensitive to the environment such as temperature, humidity and so on, and to the influence of variations in components conditions of prienter engine.

Thus, by specifying the PWM pulse pattern value as shown in the table 22a of FIG. 3, the tone density effective to the isolated dots, which are critical to the reproduction of a lower tone region, is increased twice as much as the prior art.

On the other hand, in a region in which a printed dot grows beyond one dot of the printer engine, as shown in FIGS. 4E to 4H, the printed dots have grown sufficiently large, so that a natural tone image can be ensured when the printed dots are produced in accordance with the table 22b of FIG. 3 rather than the table 22a. For this reason, the switching of pulse patterns used when printed dots are isolated and those for other cases, as does in this embodiment, functions as an effective tone characteristic improving means.

Figure 5:
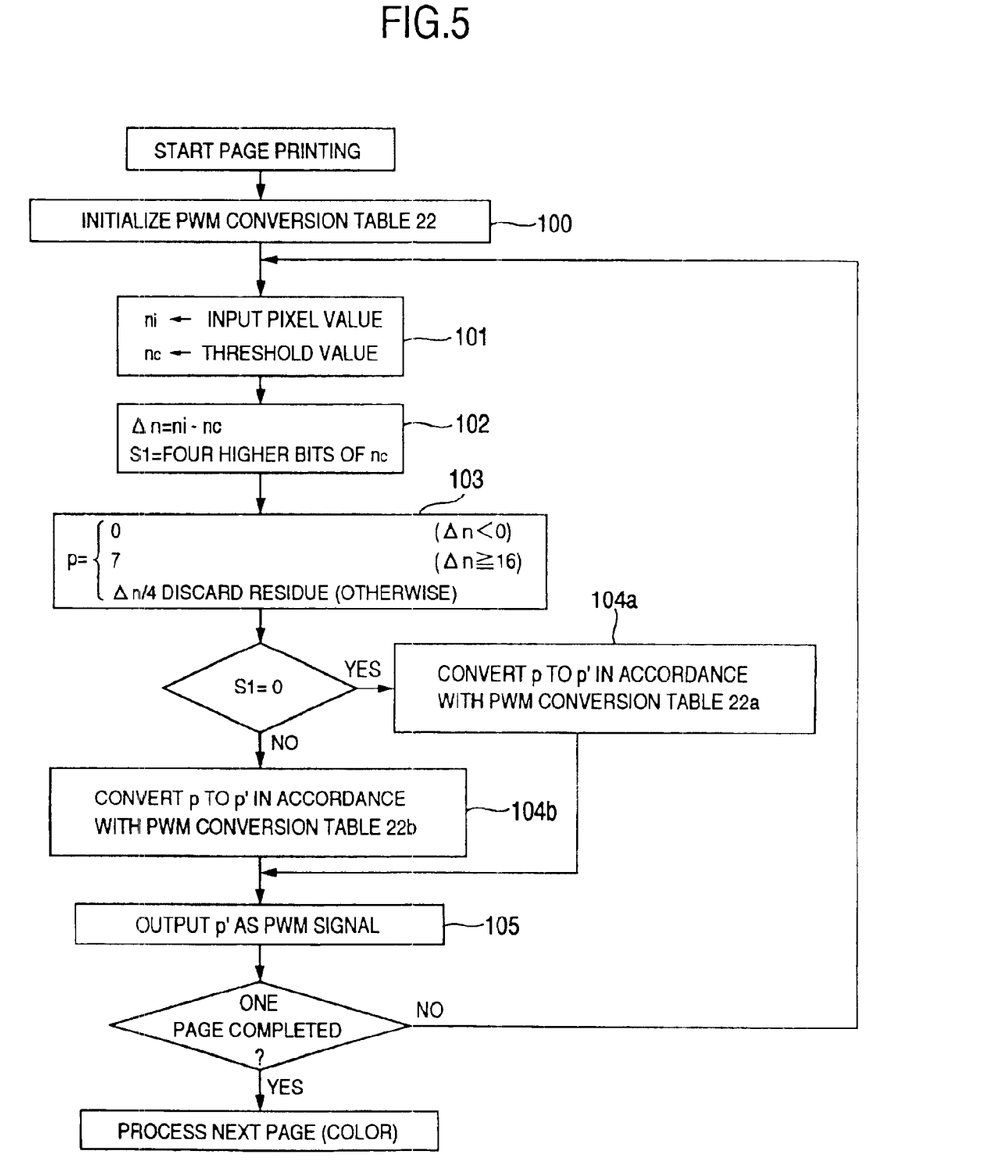
FIG. 5 is a flow chart illustrating the operation of the tone processing apparatus.

The flow of the foregoing processing in FIG. 2 is next illustrated in a flow chart of FIG. 5. It should be noted that in FIG. 5, a PWM tone value p is used to refer to the first bit region (the three lower bits of the PWM tone value p in FIG. 2) to distinguish from the value s of the second bit region (the most significant bit of the PWM tone value p in FIG. 2).

The processing is performed in units of pages, i.e., for each color plane. First, at an initialization step 100 prior to the page processing, the PWM conversion tables 22a, 22b are loaded into a PWM correcting circuit 21.

Figure 7:
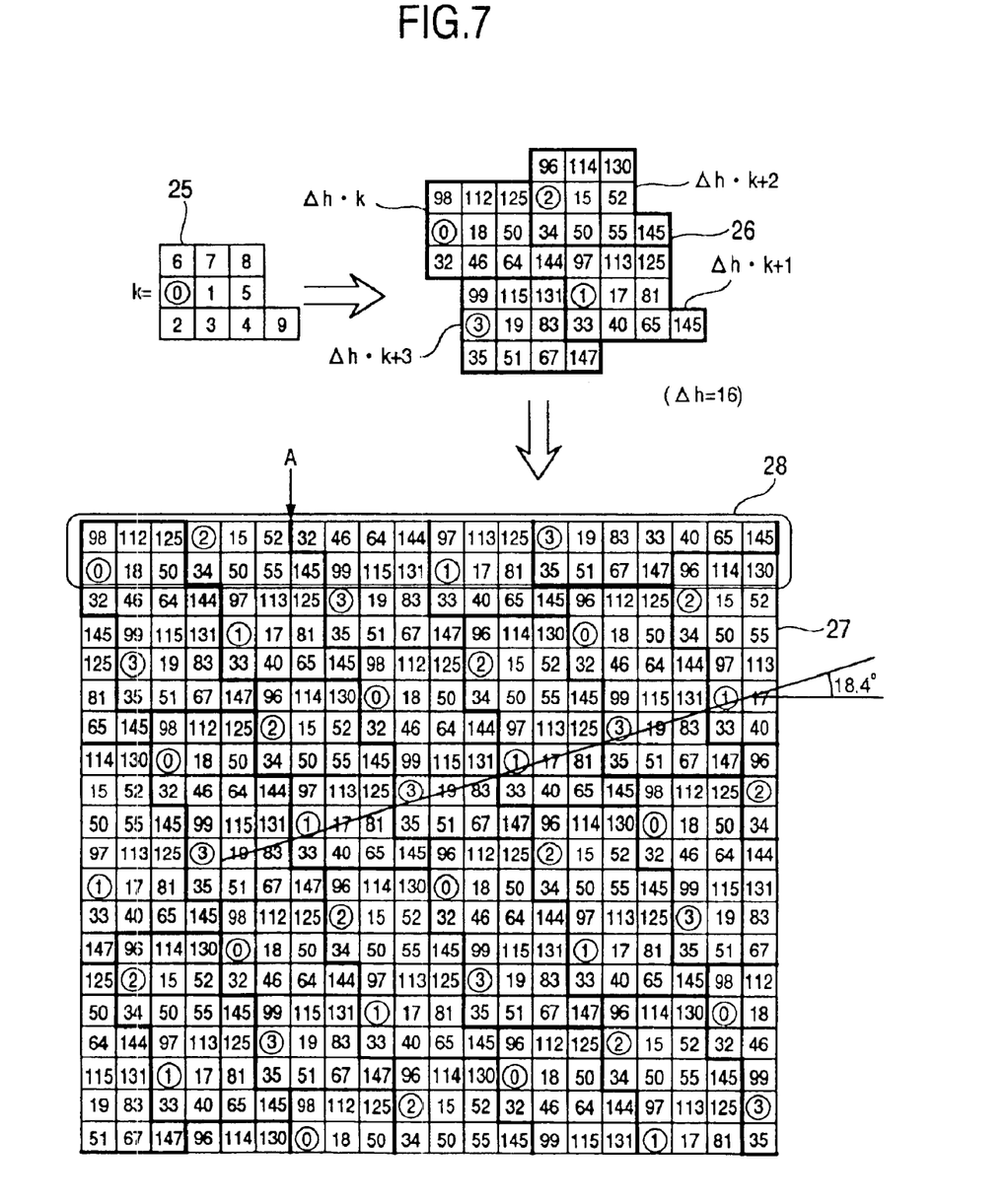
FIG. 7 is a diagram showing a method of composing a threshold value array from a basic threshold value pattern.

At next step 101, an input pixel value ni and a threshold value nc are loaded, and at step 102, a difference Δn is calculated, and the four higher bits of the input pixel value ni are set to s1. The threshold value nc loaded at step 101 is sequentially inputted by the dither circuit 10 in FIG. 1 in synchronism with the input pixel value ni based on a threshold value array 27 as shown in FIG. 7, later described, or a simplified threshold value array 28.

Next, at step 103, a PWM output value p is set to zero (p=0) when Δn<0; to seven (p=7), i,e, 3 bits full or a maximum value represented by three bits, when Δn 16; and to Δn/4 (p=Δn/4) when 0 Δn<16. The residue resulting from the division of Δn by four is discarded.

Then, this value p is used as an index at step 104a, where the output of a PWM correcting circuit 21a based on the PWM conversion table 22a is set to p' when s1=0, and at step 104b, where the output of a PWM correcting circuit 21b based on the PWM conversion table 22b is set to p' when s1≠0.

Finally at step 105, the PWM generator circuit 23 outputs the PWM output level p' to the printer engine 13 as a pulse width modulated PWM signal.

The foregoing processing is repeated from step 101 until all pixels for one page have been processed, followed by the processing of FIG. 5 repeated from the beginning for the next page or the next color plane.

Figure 6:
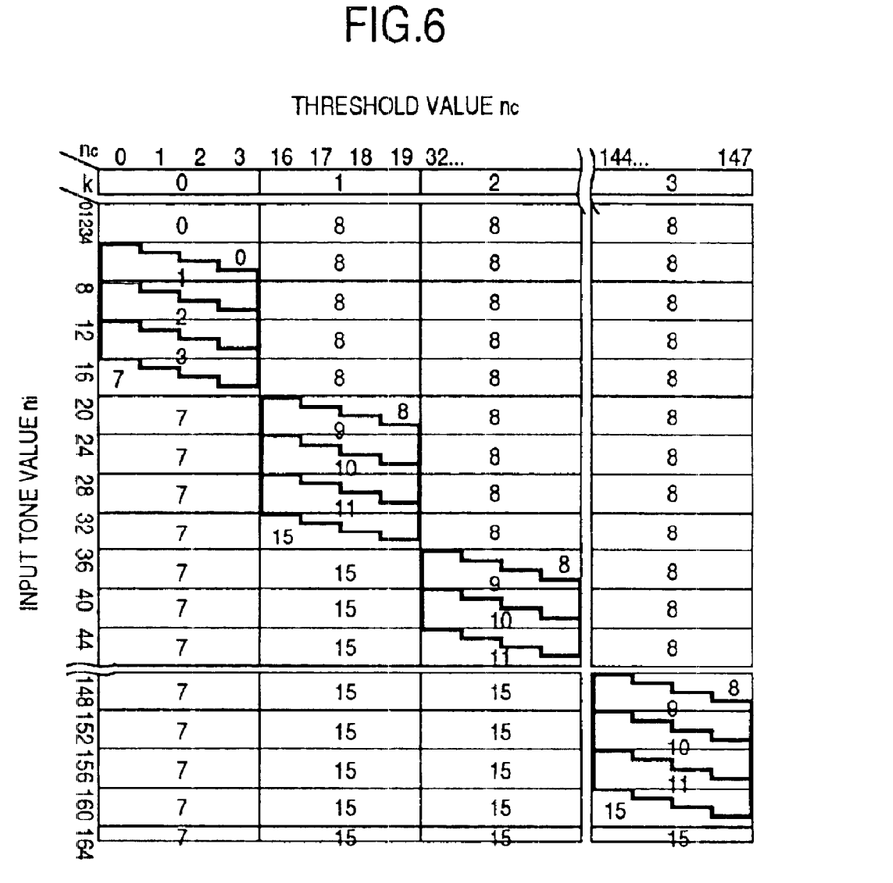
FIG. 6 is a diagram illustrating an example of an input/output correspondence.

Next, FIG. 6 shows a correspondence relationship between the input tone value ni and the threshold value nc in the circuit of FIG. 2 and the PWM tone value p in the form of table. In FIG. 6, the input tone value ni (=0 to 255) is represented in rows, and 4×10 sets of threshold values nc (={16k, 16k+1, 16k+2, 16k+3}, (k=0, 1, 2, . . . , 9)) are represented in columns. Also, examples of arrangement of threshold values in sets corresponding to FIG. 6 are shown in threshold value arrays 27 in FIG. 8, later described.

Specifically, in FIG. 6, the PWM tone value p corresponding to the input tone value ni from 0 to 3 is 0 or 8, each of which corresponds to the pulse pattern "0000" as derived from FIG. 3, so that the tone representation is identical for the input tone value ni from 0 to 3. Thus, the number of logical output tone levels produced by combinations of 40 threshold values in FIG. 6 amounts to 161.

Next, FIG. 7 shows a method of constructing a threshold value array for implementing distributed processing for divided PWM in combination with the tone processing apparatus 9 illustrated in FIG. 2.

Assume first that a basic threshold value pattern 25 is K, and a threshold value interval Δh is 16. From K, an extended threshold value pattern 26 is constructed by four threshold value patterns produced by K·Δh, K·Δh+1, K·Δh+2, K·Δh+3. Next, the extended threshold value patterns 26 are filled in a rectangular region which has periodically closed row and column to produce a threshold value array 27 as shown in FIG. 7. The dither circuit 10 periodically and repetitively uses this threshold value array 27 to generate the threshold value nc. The threshold value array 27 is constructed in such a manner that a set of two rows are stacked ten times downwardly while each set is shifted to the leftmost from the position indicated by an arrow A (the sixth column). It is therefore possible to employ a simplified threshold value array 28 formed of the upper two rows, instead of the entire threshold value array 27, such that the two rows are repetitively used in synchronism with the horizontal synchronization signal of the printer engine 13, as the initial column address is shifted by six columns for every two rows of an input image, to save the capacity of memory required for the implementation of the present invention.

Also, in the example of FIG. 7, "1" and "2" may be replaced in the arrangement of the basic threshold value pattern 25 to construct the threshold value array. In this case, printed dots outputted corresponding to "1" in the basic threshold value pattern 25 are desirably outputted in accordance with the PWM pulse patterns associated with the second bit region set at "1" in FIG. 3 in a manner similar to printed dots which are outputted corresponding to "0" in the basic threshold value pattern 25.

Such a modification can be readily supported by changing the input to the OR circuit 35 of FIG. 2 to receive the three higher bits of the threshold value array nc.

The foregoing threshold value array 27 outputs clustered-dot lattices at an angle of approximately 18.4 degrees with respect to the horizontal direction for the intermediate uniform input tone values (e.g., ni=128), as indicated by circles in FIG. 7. The angle formed by the clustered-dot lattice to the horizontal direction is referred to as the "screen angle." In general color printing, a different screen angle is used for each color plane for purposes of stabilizing reproduced colors.

Figure 8:
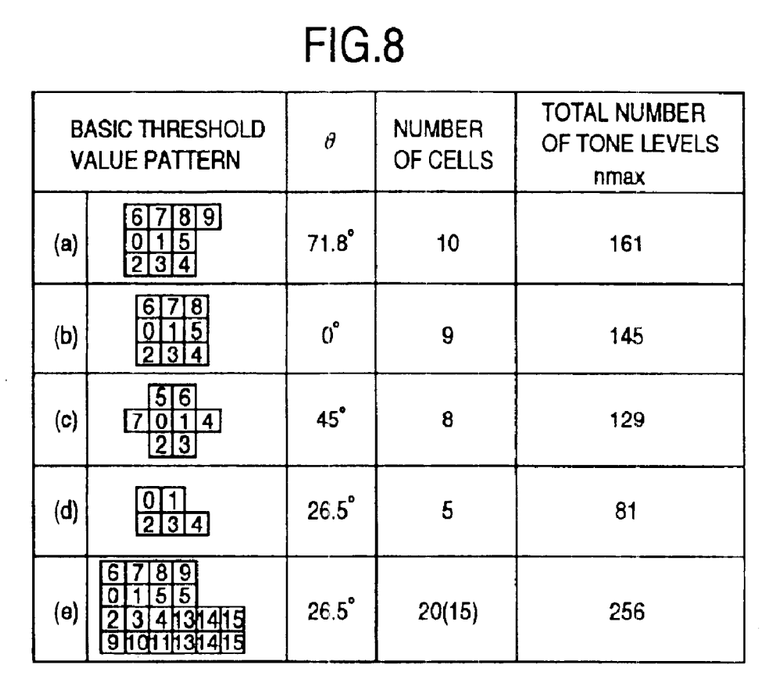
FIG. 8 is a table showing examples of basic threshold value patterns for realizing other screen angles.

Next, FIG. 8 lists, in the form of table, examples of basic threshold value patterns K corresponding to a variety of screen angles θ. The values in the table has the following relationship:

(total number of tone levels)=(number of cells)×Δh+1 (here, Δh=16).

As an example of assigning these threshold value patterns to the respective colors for color printing, when the pattern shown in FIG. 7 is assigned to Cyan; a pattern shown in FIG. 8(a) to Magenta; a pattern shown in FIG. 8(b) to Yellow; and a pattern shown in FIG. 8(c) to Black, moire due to overlapping of clustered-dot is less conspicuous in a resulting reproduced image. Of course, the patterns assigned to Magenta and Cyan may be reversed.

FIG. 8(d) shows an exemplary threshold value pattern in favor of the concentration of the clustered-dot, while FIG. 8(e) shows an exemplary threshold value pattern in favor of the halftone performance. In FIG. 8(e), however, when different values are assigned to respective cells in the basic threshold value pattern, the total number of tones exceeds 256, so that some of threshold values assigned to the respective cells in the basic threshold value pattern are repeated to limit the number of tones in the basic threshold value pattern to 16 (17 if including "0" tone), whereby the total number of tones is limited to 256.

Conversely, the exemplary threshold value patterns shown in FIGS. 8(a) to 8(d) have the total number of tones less than 256. In this case, when the input tone value exceeds the total number of tones nmax plus 3, output dots are all set to ON, thus causing collapse in a higher tone region, as will be also inferred from FIG. 6. In such a situation, a γ-correction value provided to the γ-correction unit 7 before the tone processing apparatus 9 is limited to a value which prevents the input tone value from exceeding the total number of tones nmax to readily correct the collapse, as shown in FIG. 9.

Figure 9:
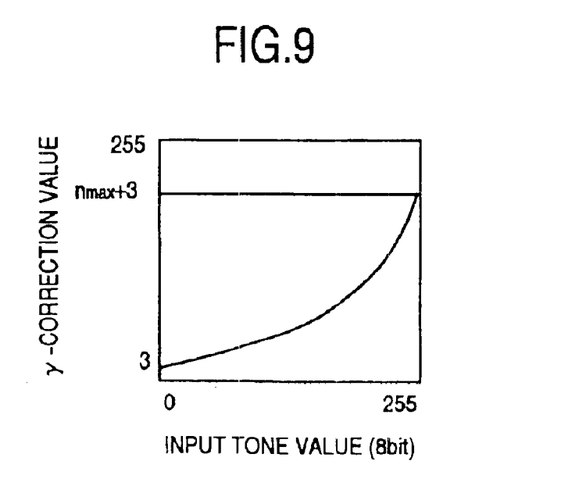
FIG. 9 is a graph showing an example of γ-correction.

In the example of FIG. 9, the γ-correction value is entirely offset by approximately +3 in order to prevent the collapse even for the input tone value ni from 0 to 3 in a highlight area.

Figure 10:
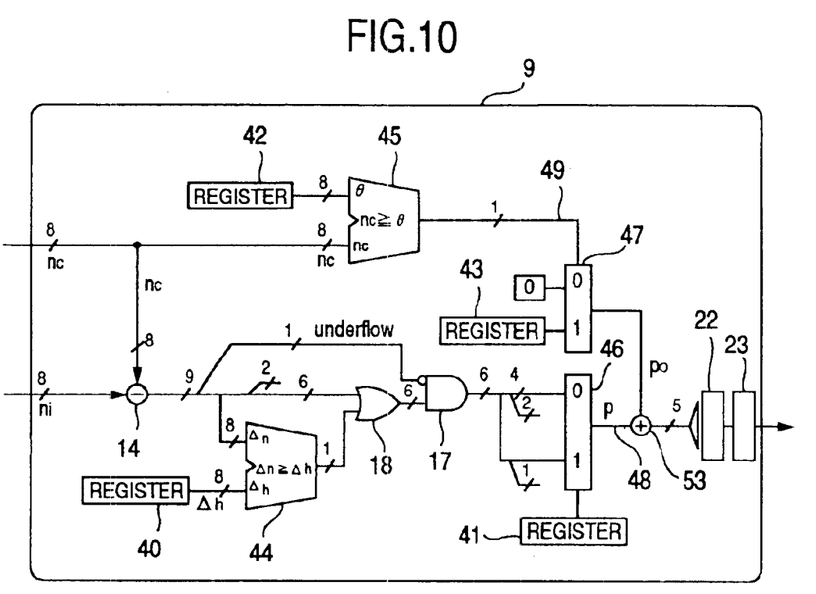
FIG. 10 is a block diagram illustrating another embodiment of the tone processing apparatus according to the present invention.

While the foregoing embodiment provides the simplest implementation, a more flexible circuit configuration is also possible provided that a slightly complicated implementation is not problematic. The next FIG. 10 illustrates an example which can produce similar effects to those of FIG. 2 even when the number of PWM stages is not a power of two. First, in comparison with FIG. 2, description is made on functions which are added to FIG. 10 and which are modified from those of FIG. 2. The OR circuit 15 for performing the overflow processing in FIG. 2 corresponds to a comparator circuit 44 in FIG. 10. The OR circuit 15 in FIG. 2 outputs an overflow signal 1 when Δn 16, while a comparator circuit 44 in FIG. 10 outputs an overflow signal 1 based on a value Δh previously set in a register 40 when Δn Δh. As a result, an output from an AND circuit 17 in FIG. 10 is limited to zero or more and Δh or less, or to the value represented by all bits set at "1."

In FIG. 2, for the output from the NAND circuit 17, the two lower bits are consistently discarded, whereas in the example of FIG. 10, discard of the two lower bits and discard of the least significant bit can be selected by a selector circuit 46 in accordance with a value previously set in a register 41.

Assuming that the number of discarded lower bits of the output from the NAND circuit 17 is s, 2^s corresponds to the number of clustered-dots which distribute the tone level, as previously shown in the example of FIG. 7. The example of FIG. 7 shows the dither pattern which grows while circulating over four (=2^2) clustered-dots corresponding to the number of truncated bits (s=2). In addition, when s=1, it is readily inferred to construct a dither pattern which alternately grows between two (=2^1) clustered-dots. For this dither pattern, for example, assuming Δh=(number of PWM stages)×2^s, the pattern of Δh·K+2 may be replaced with the pattern of Δh·K, and the pattern of Δh·K+3 may be replaced with the pattern of Δh·K+1 in the extended threshold value pattern 26 of FIG. 7.

Also, the OR circuit 35 in FIG. 2 outputs "1" only when nc 16, which is used as the most significant bit of the selection signal for switching the address in the PWM conversion table 22. In FIG. 10, on the other hand, a comparator circuit 45 and a selector circuit 47 are used to add a value previously set in a register 43 to a selection signal 49 as an address offset which is added by an adder circuit 53 for selecting a PWM pulse pattern value in the PWM conversion table, only when nc θ for the threshold value θ previously set in a register 42.

With the modifications described above, the circuit illustrated in FIG. 10 performs the same operation as that of FIG. 2 when the value (Δh) in the register 40 is set to 16; the value in the register 41 to 0; the value (θ) in the register 42 is set to 16; and the value (po) in the register 43 to 8.

Other than the foregoing settings, in the circuit illustrated in FIG. 10, when the value (Δh) in the register 40 is set to 24; the value in the register 41 to 0; the value (θ) in the register 42 is set to 24; and the value (po) in the register 43 to 7, the number of PWM stages can be set to 6, the number of distributed mesh points can be set to 4, and so on. A dither threshold values adapted to this case can be readily built by changing a multiplier Δh multiplied by the basic threshold value pattern K to 24 in the method of constructing a threshold value array shown in FIG. 7.

Figure 11:
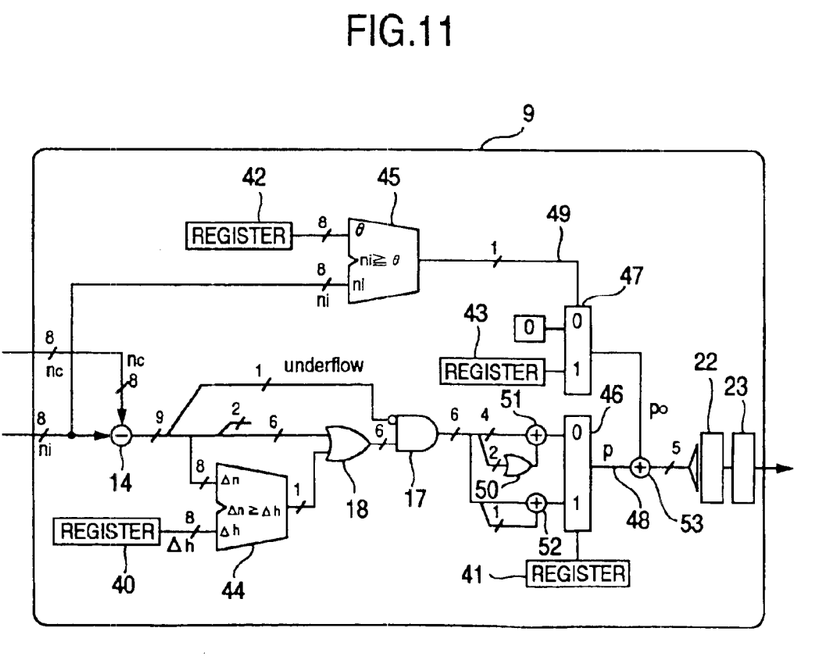
FIG. 11 is a block diagram illustrating a further embodiment of the tone processing apparatus according to the present invention.

Next, FIG. 11 illustrates another exemplary implementation. Specifically, FIG. 11 shows an example in which the value (θ) set in the register 42 is compared with a tone value ni of an input pixel. In this case as well, the same effects as those of FIG. 10 can be produced in the example of FIG. 11. Further, in FIG. 11, lower bits of an output from a NAND circuit 17 are not simply discarded, but are added to upper bits as a carry-over by an OR circuit 50 and adder circuits 51, 52.

With this processing, an input/output correspondence relationship shown in FIG. 6 for the settings corresponding to the aforementioned FIG. 2 (when set as Δh=16, s=0, θ=16, po=8) is equivalent to a relationship which shifts FIG. 6 by three rows, i.e., a correspondence relationship which adds an constant integer 3 to the input tone value, so that the offset of +3, mentioned with respect to FIG. 9, can be eliminated.

It is understood from the foregoing description that, for example, in this case (when setting Δh=16, s=0, θ=16, po=8 in FIG. 11), the PWM tone value p as an output signal from the selector circuit 46 is a value independent of the two lower bits of Δn−3 or Δn+1. It should be particularly noted that the nature of the effect of distributing PWM levels of clustered-dots growing by a combination with the threshold value pattern constructing method as shown in FIG. 7 is provided by the effect of discarding the lower bits of the difference Δn between the input tone value ni and the threshold value nc (Δn=ni−nc) (to which a constant is further added if necessary).

As described above, according to the present invention, the highlight tone concentration is stably improved by the PWM distribution processing, which is compatible with a clustered clustered-dot dither with a screen angle, and the divided PWM output patterns in a highlight area. Also, in the present invention, the foregoing effects can be realized by a small-scale circuit configuration, thereby facilitating the ASIC-based implementation of the stable halftone processing, which provides a higher resolution and a larger number of tone levels.

What is claimed is:

1. A halftone processing apparatus for a laser printer comprising:
   a PWM circuit for controlling multi-level tone through laser pulse width modulation (PWM);
   a threshold value array for converting a tone value (ni) of an input pixel to a PWM tone value (p) based on a threshold value (nc); and
   a PWM correspondence table for associating a PWM tone value (p) to a corresponding laser pulse pattern, wherein:
   said PWM tone value (p), when regarded as a bit sequence, comprises a first bit region which has a value determined depending only on a difference value (Δn= ni−nc) between said input tone value (ni) and said threshold value (nc), and a second bit region which has a value determined depending only on a value represented by said threshold value (nc) excluding four or five lower bits thereof.

2. A halftone processing apparatus according to claim 1, wherein said PWM correspondence table associates some values of said first bit region of said PWM tone value (p) to a corresponding discontinuous pulse pattern as a laser pulse pattern corresponding to said PWM tone value (p) when the value (s1) of said second bit region of said PWM tone value (p) is equal to zero (s1=0); and to a corresponding continuous pulse pattern when said value s1 is not equal to zero (s1≠0), or to a corresponding discontinuous pulse pattern when said value s1 is not equal to zero (s1≠0); and to a corresponding continuous pulse pattern when s1 is equal to zero (s1=0).

3. A halftone processing apparatus according to claim 1, wherein said first bit region of said PWM tone value (p) is determined for said difference value (Δn) and a certain constant integer (d) irrespective of the value represented by the two lower bits or the least significant bit of a value (Δn+d).

4. A halftone processing apparatus according to claim 3, wherein said PWM tone value (p) for a uniform input sequentially increases as said PWM tone value (p) circulates over four pixels, corresponding to an increase in the value represented by the two lower bits of said input tone value (ni).

5. A halftone processing apparatus according to claim 3, wherein said laser printer is a color printer which performs multi-color printing through a plane sequential printing process for at least three colors, and comprises said threshold value array for each color plane to switch said threshold value array from one color plane to another.

6. A halftone processing apparatus for a laser printer comprising:
   a PWM circuit for controlling multi-level halftone through laser pulse width modulation (PWM);
   a threshold value array for converting a tone value (ni) of an input pixel to a PWM tone value (p) based on a threshold value (nc);
   a PWM correspondence table for associating said PWM tone value (p) to a corresponding laser pulse pattern;
   registers for holding a threshold value (θ) and an address offset value (p0); and
   an adder circuit for adding said address offset value (p0) to said PWM tone value (p),
   wherein said PWM tone value (p), before being added with said address offset value (p0), depends on a difference (Δn=ni−nc) between said tone value (ni) of said input pixel and said threshold value (nc), and said address offset value (p0) to be added to said PWM tone value (p) is a value which is switched on the basis of a comparison of said threshold value (nc) with said threshold value (θ), or a comparison of said tone value (ni) of said input pixel with said threshold value (θ).

7. A halftone processing apparatus according to claim 6, wherein said PWM correspondence table associates laser pulse patterns to some of said PWM tone values (p) such that one pulse pattern associated with said PWM tone value (p) and another pulse pattern associated with the sum of said PWM tone value and said address offset value (p+p0) is a discontinuous pulse pattern and the other is a continuous pulse pattern, such that there is such a value p that one of p and p+p0 is discontinuous and the other is continuous.

8. A halftone processing apparatus according to claim 7, wherein said PWM tone value (p), before said address offset value (p0) is added thereto, is determined for said difference value (Δn) and a suitable integer constant (d) irrespective of the value represented by two lower bits or least significant bit of a value (Δn+d).

9. A halftone processing apparatus according to claim 8, wherein said PWM tone value (p) for a uniform input sequentially increases as said PWM tone value (p) circulates over four pixels, corresponding to an increase in the value represented by the two lower bits of said input tone value (ni).

10. A halftone processing apparatus according to claim 8, wherein said laser printer is a color printer which performs multi-color printing through a plane sequential printing process for at least three colors, and comprises said threshold value array for each color plane to switch said threshold value array from one color plane to another.

11. A halftone processing apparatus for use in a laser printer comprising:
- a PWM circuit for controlling multi-level tone through laser pulse width modulation (PWM);
- a threshold value array for converting a tone value (ni) of an input pixel to a PWM tone value (p) based on a threshold value (nc);
- a PWM conversion table for associating the PWM tone value (p) to a corresponding laser pulse pattern,
- wherein said PWM tone value (p), when regarded as a bit sequence, comprises a first bit region which has a value determined depending only on a difference value ($\Delta n = ni - nc$) between said tone value (ni) of an input pixel and said threshold value (nc), and a second bit region which has a value determined depending only on a value represented by said threshold value (nc).

12. A halftone processing apparatus according to claim 11, wherein said PWM conversion table associates bit values within said first bit region of said PWM tone value (p) to a corresponding discontinuous pulse pattern as a laser pulse pattern, when the value (s1) within said second bit region of said PWM tone value (p) is equal to zero (s1=0); and to a corresponding continuous pulse pattern, when said value s1 is not equal to zero (s1≠0), or alternatively, to a corresponding discontinuous pulse pattern, when said value s1 is not equal to zero (s1≠0); and to a corresponding continuous pulse pattern, when s1 is equal to zero (s1=0).

13. A tone processing apparatus according to claim 12, wherein said laser printer is a color printer which performs multi-color printing through a plane sequential printing process for at least three colors, and comprises said threshold value array for each color plane to switch said threshold value array from one color plane to another color plane.

14. A halftone processing apparatus according to claim 11, wherein said first bit region of said PWM tone value (p) is determined for said difference value ($\Delta n$) and a certain constant integer (d) irrespective of the value represented by two lower bits or a least significant bit of a value ($\Delta n + d$).

* * * * *